(12) United States Patent
Mitsui et al.

(10) Patent No.: US 12,007,181 B2
(45) Date of Patent: Jun. 11, 2024

(54) HEAT STORAGE MEMBER

(71) Applicant: FUJIFILM Corporation, Tokyo (JP)

(72) Inventors: Tetsuro Mitsui, Shizuoka (JP); Aya Nakayama, Shizuoka (JP); Takuto Matsushita, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 334 days.

(21) Appl. No.: 17/505,636

(22) Filed: Oct. 20, 2021

(65) Prior Publication Data

US 2022/0034608 A1 Feb. 3, 2022

Related U.S. Application Data

(63) Continuation of application No. PCT/JP2020/015802, filed on Apr. 8, 2020.

(30) Foreign Application Priority Data

Apr. 25, 2019 (JP) .................................. 2019-084117

(51) Int. Cl.
*F28F 21/06* (2006.01)
*C09D 7/61* (2018.01)
*C09K 5/06* (2006.01)

(52) U.S. Cl.
CPC .............. *F28F 21/06* (2013.01); *C09D 7/61* (2018.01); *C09K 5/063* (2013.01); *F28F 2245/00* (2013.01); *F28F 2260/00* (2013.01)

(58) Field of Classification Search
CPC .... F28F 21/06; F28F 2245/00; F28F 2260/00; C09D 7/61; C09K 5/063; C09K 5/06; F25D 20/023; C08K 3/04; Y02E 60/14; B32B 27/18; B32B 27/20; B32B 7/027; F28D 20/02
See application file for complete search history.

(56) References Cited

U.S. PATENT DOCUMENTS

| | | | |
|---|---|---|---|
| 2012/0138275 A1* | 6/2012 | Biggin | ........................ C08J 9/32 |
| | | | 165/104.34 |
| 2018/0158974 A1* | 6/2018 | Hiraki | ..................... B32B 27/08 |

FOREIGN PATENT DOCUMENTS

| CN | 201991087 U | * | 9/2011 |
|---|---|---|---|
| CN | 103833302 A | * | 6/2014 |
| CN | 103833302 B | * | 8/2016 |
| JP | H0316730 | | 1/1991 |
| JP | H06155905 A | * | 6/1994 |
| JP | 2000314187 | | 11/2000 |
| JP | 2000314187 A | * | 11/2000 |
| JP | 2005274860 A | * | 10/2005 |
| JP | 2005324437 | | 11/2005 |

(Continued)

OTHER PUBLICATIONS

"Office Action of Taiwan Counterpart Application", dated Aug. 8, 2023, with partial of English translation thereof, p. 1-p. 13.
"Office Action of Japan Counterpart Application" with English translation thereof, dated May 24, 2022, p. 1-p. 24.
"Office Action of Korea Counterpart Application", dated Aug. 21, 2023, with English translation thereof, p. 1-p. 8.

(Continued)

*Primary Examiner* — Emmanuel E Duke
(74) *Attorney, Agent, or Firm* — JCIPRNET

(57) ABSTRACT

The present invention provides a heat storage member which is excellent in a heat storage property and of which a chronological change in a tint is suppressed. A heat storage member according to an embodiment of the present invention includes a heat storage sheet containing a microcapsule encompassing a heat storage material, and a colored layer.

18 Claims, 1 Drawing Sheet

(56) References Cited

FOREIGN PATENT DOCUMENTS

| | | | | |
|---|---|---|---|---|
| JP | 2006150953 | | 6/2006 | |
| JP | 2006233342 | | 9/2006 | |
| JP | 2009051016 A | * | 3/2009 | |
| JP | 2009138339 | | 6/2009 | |
| JP | 2009138339 A | * | 6/2009 | ............ C04B 40/04 |
| JP | 3159150 | | 5/2010 | |
| JP | 2011252614 A | * | 12/2011 | |
| JP | 2016196151 A | * | 11/2016 | |
| JP | 2016222135 A | * | 12/2016 | |
| JP | 2019009263 A | * | 1/2019 | |
| KR | 20160138611 | | 12/2016 | |
| KR | 20160138611 A | * | 12/2016 | ............ E04B 1/80 |

OTHER PUBLICATIONS

"Office Action of China Counterpart Application", dated Nov. 15, 2022, with English translation thereof, pp. 1-15.

"International Search Report (Form PCT/ISA/210) of PCT/JP2020/015802," dated Jul. 7, 2020, with English translation thereof, pp. 1-7.

"Written Opinion of the International Searching Authority (Form PCT/ISA/237)" of PCT/JP2020/015802, dated Jul. 7, 2020, with English translation thereof, pp. 1-13.

"Office Action of China Counterpart Application", dated Feb. 9, 2023, with English translation thereof, p. 1-p. 11.

"Office Action of Korea Counterpart Application", issued on Feb. 26, 2024, with English translation thereof, p. 1-p. 12.

* cited by examiner

HEAT STORAGE MEMBER

CROSS-REFERENCE TO RELATED APPLICATIONS

This application is a Continuation of PCT International Application No. PCT/JP2020/015802 filed on Apr. 8, 2020, which claims priority under 35 U.S.C. § 119(a) to Japanese Patent Application No. 2019-084117 filed on Apr. 25, 2019. The above application is hereby expressly incorporated by reference, in its entirety, into the present application.

BACKGROUND OF THE INVENTION

1. Field of the Invention

The present invention relates to a heat storage member.

2. Description of the Related Art

In recent years, a microcapsule, which encompasses functional materials such as a heat storage material, a fragrance, a dye, and a pharmaceutical component, has attracted attention.

For example, a microcapsule, which encompasses paraffins or the like as a phase change material (PCM), has been known. Specifically, JP2006-233342A discloses a microcapsule in which a heat storage material is encompassed by a capsule wall formed of polyurethane or the like.

SUMMARY OF THE INVENTION

The present inventors have examined a characteristic of a heat storage sheet containing the microcapsule encompassing the heat storage material disclosed in JP2006-233342A, and as a result, the present inventors have found that there is a problem that a tint is changed chronologically.

In view of the above circumstances, the present invention is to provide a heat storage member which is excellent in a heat storage property and of which a chronological change in the tint is suppressed.

As a result of diligent studies on the above objects, the present inventors have found that the above objects can be solved by the configurations as follows.

(1) A heat storage member comprising a heat storage sheet containing a microcapsule encompassing a heat storage material, and a colored layer.

(2) The heat storage member according to (1), in which a capsule wall of the microcapsule contains at least one selected from the group consisting of polyurethane urea, polyurethane, and polyurea.

(3) The heat storage member according to (1) or (2), in which a film thickness of the colored layer is 15 μm or less, and an optical density of the heat storage member is 1.0 or more.

(4) The heat storage member according to any one of (1) to (3), in which the colored layer is positioned on an outermost layer.

(5) The heat storage member according to any one of (1) to (4), in which the colored layer contains a resin selected from the group consisting of a fluororesin and a siloxane resin.

(6) The heat storage member according to any one of (1) to (5), further comprising a protective layer on a surface of the colored layer opposite to the heat storage sheet.

(7) The heat storage member according to (6), in which the protective layer contains a resin selected from the group consisting of a fluororesin and a siloxane resin.

(8) The heat storage member according to any one of (1) to (7), in which a thickness of the colored layer is 0.5 to 10 μm.

(9) The heat storage member according to any one of (1) to (8), in which a ratio of a thickness of the colored layer to a thickness of the heat storage sheet is 1/20 or less, and a content of the heat storage material to a total mass of the heat storage sheet is 65% by mass or more.

(10) The heat storage member according to any one of (1) to (9), in which the colored layer contains a black pigment.

(11) The heat storage member according to (10), in which a content of the black pigment to a total volume of the colored layer is 2% to 30% by volume.

(12) The heat storage member according to any one of (1) to (11), in which a content of the microcapsule to a total mass of the heat storage sheet is 75% by mass or more.

(13) The heat storage member according to any one of (1) to (12), in which a latent heat capacity of the heat storage member is 125 J/ml or more.

(14) The heat storage member according to any one of (1) to (13), in which a latent heat capacity of the heat storage member is more than 145 J/g.

According to the present invention, it is possible to provide a heat storage member which is excellent in a heat storage property and of which a chronological change in a tint is suppressed.

DESCRIPTION OF THE PREFERRED EMBODIMENTS

The present invention will be described below in detail.

Note that in the present specification, the numerical range represented by using "to" means a range including numerical values denoted before and after "to" as a lower limit value and an upper limit value.

A heat storage member according to an embodiment of the present invention includes a colored layer.

The present inventors have found that a tint of a heat storage sheet containing a microcapsule encompassing a heat storage material may be changed during handling or storage due to a stain, passing of time, or the like. In particular, in a case in which a capsule wall of the microcapsule contains at least one selected from the group consisting of polyurethane urea, polyurethane, and polyurea, the tint change further significantly occurs. Therefore, the present inventors suppress the tint change without impairing a heat storage property of the heat storage sheet by providing the colored layer separately from the heat storage sheet. As the reason why the tint change is suppressed, it is considered that even in a case in which the tint of the heat storage sheet itself is changed, the tint change is difficult to be visible due to the presence of the colored layer, and a physical/chemical change of the microcapsule is suppressed by providing the colored layer and preventing rubbing during handling or water from the outside from entering the heat storage sheet. Note that as shown in Comparative Example, which will be described below, in a case in which the heat storage sheet contains a coloring agent, the heat storage property of the heat storage sheet tends to decrease.

First Embodiment

Figure 1:
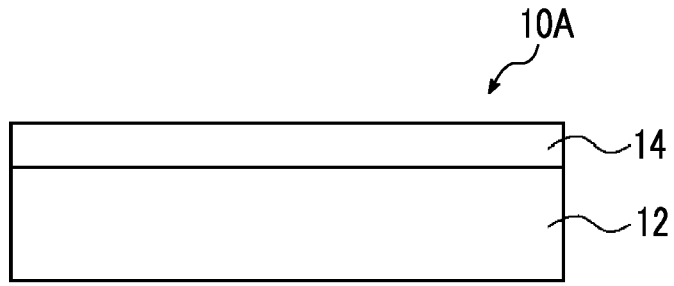
FIG. 1 is a cross-sectional view of a heat storage member according to a first embodiment.

FIG. 1 is a cross-sectional view of a heat storage member according to a first embodiment.

A heat storage member 10A includes a heat storage sheet 12 and a colored layer 14 disposed on the heat storage sheet 12. In the heat storage member 10A, by disposing the colored layer 14 on a visible side, even in a case in which the tint change of the heat storage sheet 12 occurs, the change is difficult to be visible, and as a result, the tint change of the entire heat storage member 10A is suppressed.

Hereinafter, each member will be described in detail.

Heat Storage Sheet

The heat storage sheet contains the microcapsule encompassing the heat storage material.

The microcapsule has a core portion and the capsule wall which encompasses a core material (encompassed material (also referred to as an encompassed component)) which forms the core portion.

The microcapsule encompasses the heat storage material as the core material (encompassed component). Since the heat storage material is encompassed in the microcapsule, the heat storage material can be stably present in a phase state depending on the temperature.

Heat Storage Material

A type of heat storage material is not particularly limited, and can be appropriately selected from a material in which a phase change between a solid phase and a liquid phase can be repeated with a state change of melting and solidification depending on the temperature change.

It is preferable that the phase change of the heat storage material be based on the melting point of the heat storage material itself.

As the heat storage material, for example, any of a material which can store heat which is generated outside the heat storage sheet as sensible heat or a material (hereinafter, also referred to as a "latent heat storage material") which can store heat which is generated outside the heat storage sheet as latent heat may be adopted. It is preferable that the heat storage material be a material which can radiate the stored heat.

Among these, it is preferable that the heat storage material be the latent heat storage material, from the viewpoint of the ease of the control of the amount of heat which can be transferred, and the magnitude of the amount of heat.

The latent heat storage material means a material which stores heat, which is generated outside the heat storage sheet, as latent heat, and transfers heat due to latent heat by repeating the change between melting and solidification with the melting point determined by the material as a phase change temperature.

The latent heat storage material can utilize the heat of melting at the melting point and the heat of solidification at a solidifying point, can store heat and can radiate heat depending on the phase change between the solid and the liquid.

A type of the latent heat storage material is not particularly limited, and it can be selected from compounds having a melting point and capable of changing a phase.

Examples of the latent heat storage material include ice (water); an inorganic salt; an aliphatic hydrocarbon such as paraffin (for example, isoparaffin and normal paraffin) and the like; a fatty acid ester compound such as caprylic/capric triglyceride, methyl myristate (melting point of 16° C. to 19° C.), isopropyl myristate (melting point of 167° C.), and dibutyl phthalate (melting point of −35° C.); an aromatic hydrocarbon such as an alkylnaphthalene compound such as diisopropylnaphthalene (melting point of 67° C. to 70° C.), a diarylalkane compound such as 1-phenyl-1-xylylethane (melting point lower than −50° C.), an alkylbiphenyl compound such as 4-isopropylbiphenyl (melting point of 11° C.), a triarylmethane compound, an alkylbenzene compound, a benzylnaphthalene compound, a diarylalkylene compound, and an arylindane compound; natural animal and plant oils such as camellia oil, soybean oil, corn oil, cotton seed oil, rapeseed oil, olive oil, coconut oil, castor oil, and fish oil; and mineral oil.

The melting point of the heat storage material is not particularly limited, and it need only be appropriately selected depending on a type of a heat generating body which generates heat, a heat generating temperature of the heat generating body, a temperature or a holding temperature after cooling, a cooling method, and the like.

It is preferable that the heat storage material be selected from a material having the melting point in a target temperature region (for example, an operating temperature of the heat generating body; hereinafter, also referred to as a "heat control region").

Specifically, the melting point of the heat storage material differs depending on the heat control region, but as the heat storage material, the heat storage material having the following melting points is preferable from the viewpoint of application to an electronic device (in particular, a small or portable electronic device).

(1) As the heat storage material (preferably, the latent heat storage material), the heat storage material having the melting point of 0° C. to 80° C. is preferable.

In a case in which the heat storage material having the melting point of 0° C. to 80° C. is used, the material having the melting point lower than 0° C. or higher than 80° C. is not included in the heat storage material. Among the materials having the melting point lower than 0° C. or higher than 80° C., the material in a liquid state may be used in combination with the heat storage material as a solvent.

(2) In the above (1), the heat storage material having the melting point of 10° C. to 70° C. is preferable.

In a case in which the heat storage material having the melting point of 10° C. to 70° C. is used, the material having the melting point lower than 10° C. or higher than 70° C. is not included in the heat storage material. Among the materials having the melting point lower than 10° C. or higher than 70° C., the material in the liquid state may be used in combination with the heat storage material as the solvent.

(3) Further, among the above (2), the heat storage material having the melting point of 15° C. to 50° C. is preferable.

In a case in which the heat storage material having the melting point of 15° C. to 50° C. is used, the material having the melting point lower than 15° C. or higher than 50° C. is not included in the heat storage material. Among the materials having the melting point lower than 15° C. or higher than 50° C., the material in the liquid state may be used in combination with the heat storage material as the solvent.

Among these, as the latent heat storage material, paraffin is preferable from the viewpoint of having more excellent heat storage property of the heat storage member.

The melting point of the paraffin is not particularly limited, but from the viewpoint of applying of the heat storage member to various applications, it is preferably 0° C. or higher, more preferably 15° C. or higher, and further preferably 20° C. or higher. An upper limit is not particularly limited, but it is preferably 80° C. or lower, more preferably 70° C. or lower, and further preferably 50° C. or lower.

As the paraffin, an aliphatic hydrocarbon is preferable from the viewpoint of having a more excellent heat storage property of the heat storage member. Although the number of carbon atoms of the aliphatic hydrocarbon is not particularly limited, but it is preferably 14 or more, and more preferably 16 or more. An upper limit is not particularly limited, but it is 26 or less in many cases.

As the paraffin, an aliphatic hydrocarbon having a melting point of 0° C. or higher is preferable, and an aliphatic hydrocarbon having a melting point of 0° C. or higher and having 14 or more carbon atoms is more preferable.

Examples of the aliphatic hydrocarbon having the melting point of 0° C. or higher include tetradecane (melting point of 6° C.), pentadecane (melting point of 10° C.), hexadecane (melting point of 18° C.), heptadecane (melting point of 22° C.), octadecane (melting point of 28° C.), nonadecane (melting point of 32° C.), icosane (melting point of 37° C.), henicosane (melting point of 40° C.), docosane (melting point of 44° C.), tricosane (melting point of 48° C. to 50° C.), tetracosane (melting point of 52° C.), pentacosane (melting point of 53° C. to 56° C.), heptacosane (melting point of 60° C.), octacosane (melting point of 65° C.), nonacosane (melting point of 63° C. to 66° C.), and triacontane (melting point of 64° C. to 67° C.).

As the inorganic salt, an inorganic hydrated salt is preferable, and the examples thereof include alkali metal chloride hydrate (for example, sodium chloride dihydrate), alkali metal acetate hydrate (for example, sodium acetate hydrate), alkali metal sulfate hydrate (for example, sodium sulfate hydrate), alkali metal thiosulfate hydrate (for example, sodium thiosulfate hydrate), alkaline earth metal sulfate hydrate (for example, calcium sulfate hydrate), and alkaline earth metal chloride hydrate (for example, calcium chloride hydrate).

The heat storage material may be used alone, or may be used in a combination of two types or more. By using the heat storage material alone or a plurality of types of heat storage materials having different melting points, it is possible to adjust the temperature region in which the heat storage property is exhibited and the amount of heat storage depending on the application.

The temperature region in which heat can be stored can be expanded by mixing the heat storage material, as a center material, having the melting point at the center temperature at which the heat storage effect of the heat storage material is desired, and the heat storage material having the melting point before and after the center temperature. An example of a case in which the paraffin is used as the heat storage material will be specifically described. Paraffin a having the melting point at the center temperature at which the heat storage effect of the heat storage material is desired is used as a center material, and the paraffin a and another paraffin which has the carbon atoms before and after the paraffin a are mixed, so that the design can be made such that the heat storage sheet has a wide temperature region (heat control region).

In addition, the content of paraffin having the melting point at the center temperature at which the heat storage effect is desired is not particularly limited, but it is preferably 80% by mass or more, more preferably 90% by mass or more, and further preferably 95% by mass or more, based on the total mass of the heat storage material. For example, an upper limit is 100% by mass.

In a case in which the paraffin is used as the heat storage material, for example, the paraffin may be used alone or may be used in a combination of two types or more. In a case in which a plurality of the paraffins which have different melting points are used, the temperature region in which the heat storage property is exhibited can be widened.

In a case in which the plurality of paraffins are used, from the viewpoints of the temperature region in which the heat storage property is exhibited and the amount of heat storage, the content of the main paraffin is not particularly limited, but it is preferably 80% by mass to 100% by mass, more preferably 90% by mass to 100% by mass, and further preferably 95% by mass to 100% by mass, based on the total mass of the paraffin Note that the "main paraffin" refers to the paraffin having the largest content among the plurality of paraffins which are contained. It is preferable that the content of the main paraffin to the total mass of the paraffin be 50% by mass or more.

In addition, the content of the paraffin is not particularly limited, but it is preferably 80% to 100% by mass, more preferably 90% to 100% by mass, and further preferably 95% to 100% by mass, based on the total mass of the heat storage material (preferably, the latent heat storage material).

A content of the heat storage material in the heat storage sheet is not particularly limited, but from the viewpoint of having more excellent heat storage property of the heat storage member, it is preferably 65% by mass or more, more preferably 75% by mass or more, and further preferably 80% by mass or more, based on the total mass of the heat storage sheet. An upper limit of the content of the heat storage material is not particularly limited, but it is preferably 99.9% by mass or less, more preferably 99% by mass or less, and further preferably 98% by mass or less based on the total mass of the heat storage sheet, from the viewpoint of the strength of the heat storage sheet.

Other Components

As the core material of the microcapsule, components other than the heat storage material described above may be encompassed. Examples of other components which can be encompassed in the microcapsule as the core material include the solvent, and an additive such as the flame retardant.

A content of the heat storage material in the core material is not particularly limited, but it is preferably 80% to 100% by mass, and more preferably 90% to 100% by mass, based on the total mass of the core material, from the viewpoint of having more excellent heat storage property of the heat storage sheet.

The microcapsule may encompass the solvent as the core material.

Examples of the solvent in this case include the heat storage material described above of which the melting point is outside the temperature region in which the heat storage sheet is used (heat control region; for example, the operating temperature of the heat generating body). That is, the solvent refers to a solvent which does not change the phase in the liquid state in the heat control region, and is distinguished from the heat storage material which causes a phase transition in the heat control region to cause a heat absorption reaction or a heat radiation reaction.

A content of the solvent in the core material is not particularly limited, but it is preferably less than 30% by mass, more preferably less than 10% by mass, and further preferably 1% by mass or less, based on the total mass of the core material. A lower limit is not particularly limited, but it is 0% by mass, for example.

Examples of other components which can be encompassed as the core material in the microcapsule include additives such as an ultraviolet absorbing agent, a light stabilizer, an antioxidant, a wax, and an odor suppressant.

Capsule Wall (Wall Portion)

The microcapsule has the capsule wall which encompasses the core material.

A material which forms the capsule wall of the microcapsule is not particularly limited, examples thereof include the polymer, and more specifically, examples thereof include polyurethane urea, polyurethane, polyurea, a melamine resin, and an acrylic resin.

From the viewpoints of capable of thinning the capsule wall and having more excellent heat storage property of the heat storage member, the capsule wall preferably contains polyurethane urea, polyurethane, polyurea, or a melamine resin, and more preferably contains polyurethane urea, polyurethane, or polyurea.

Note that polyurethane is a polymer which has a plurality of urethane bonds, and is preferably a reaction product of polyol and polyisocyanate.

In addition, polyurea is a polymer which has a plurality of urea bonds, and is preferably a reaction product of polyamine and polyisocyanate.

In addition, polyurethane urea is a polymer which has the urethane bond and the urea bond, and is preferably a reaction product of polyol, polyamine, and polyisocyanate. Note that in a case in which polyol and polyisocyanate are reacted with each other, a part of polyisocyanate reacts with water to form polyamine, and as a result, polyurethane urea may be obtained.

In addition, it is preferable that the microcapsule be present as a deformable particle.

In a case in which the microcapsule is the deformable particle, the microcapsule can be deformed without breaking, and a filling rate of the microcapsule in the heat storage sheet can be improved. As a result, it is possible to increase the amount of the heat storage material in the heat storage sheet, and more excellent heat storage property can be realized.

Note that deformation of the microcapsule without breaking means the deformation from the shape in a state in which no external pressure is applied to individual microcapsules, regardless of the degree of deformation. Examples of the deformation which occurs in the microcapsule include deformation in which spherical surfaces come into contact with each other to form a flat contact surface in a case in which the microcapsules are pressed against each other in the heat storage sheet.

As the material for forming the capsule wall, polyurethane urea, polyurethane, or polyurea is preferable from the viewpoint that the microcapsule can be the deformable particle.

As described above, it is preferable that polyurethane, polyurea, and polyurethane urea be formed by using polyisocyanate.

Polyisocyanate is a compound which has two or more isocyanate groups, and examples thereof include aromatic polyisocyanate and aliphatic polyisocyanate.

Examples of the aromatic polyisocyanate include m-phenylene diisocyanate, p-phenylene diisocyanate, 2,6-tolylene diisocyanate, 2,4-tolylene diisocyanate, naphthalene-1,4-diisocyanate, diphenylmethane-4,4'-diisocyanate, 3,3'-dimethoxy-biphenyldiisocyanate, 3,3'-dimethyldiphenylmethane-4,4'-diisocyanate, xylylene-1,4-diisocyanate, xylylene-1,3-diisocyanate, 4-chloroxylylene-1,3-diisocyanate, 2-methylxylylene-1,3-diisocyanate, 4,4'-diphenylpropane diisocyanate, and 4,4'-diphenylhexafluoropropane diisocyanate.

Examples of the aliphatic polyisocyanate include trimethylene diisocyanate, hexamethylene diisocyanate, propylene-1,2-diisocyanate, butylene-1,2-diisocyanate, cyclohexylene-1,2-diisocyanate, cyclohexylene-1,3-diisocyanate, cyclohexylene-1,4-diisocyanate, dicyclohexylmethane-4,4'-diisocyanate, 1,4-bis(isocyanatomethyl)cyclohexane, 1,3-bis(isocyanatomethyl)cyclohexane, isophorone diisocyanate, lysine diisocyanate, and hydrogenated xylylene diisocyanate.

Note that in the above, bifunctional aromatic polyisocyanate and aliphatic polyisocyanate are described as an example, but examples of the polyisocyanate also include trifunctional or more functional polyisocyanate (for example, trifunctional triisocyanate and tetrafunctional tetraisocyanate).

More specifically, examples of the polyisocyanate also include a biuret or isocyanurate, which is a trimer of the above bifunctional polyisocyanate, an adduct of polyol such as trimethylolpropane and the bifunctional polyisocyanate, a formalin condensate of benzene isocyanate, polyisocyanate which has the polymerizable group such as methacryloyloxyethyl isocyanate, lysine triisocyanate, and the like.

Polyisocyanate is described in the "Polyurethane resin handbook" (edited by Keiji Iwata, published by Nikkan Kogyo Shimbun (1987)).

Among these, as polyisocyanate, trifunctional or more functional polyisocyanate is preferable.

Examples of the trifunctional or more functional polyisocyanate include trifunctional or more functional aromatic polyisocyanate, and trifunctional or more functional aliphatic polyisocyanate.

As the trifunctional or more functional polyisocyanate, trifunctional or more functional polyisocyanate (adduct type trifunctional or more functional polyisocyanate) which is an adduct body (adduct) of bifunctional polyisocyanate and a compound (for example, trifunctional or more functional polyol, polyamine, or polythiol) which has three or more active hydrogen groups in the molecule, and a trimer (biuret type or isocyanurate type) of bifunctional polyisocyanate are also preferable.

Examples of the adduct type trifunctional or more functional polyisocyanate include Takenate (registered trademark) D-102, D-103, D-103H, D-103M2, P49-75S, D-110N, D-120N, D-140N, D-160N (which are manufactured by Mitsui Chemicals, Inc.), Desmodur (registered trademark) L75, UL57SP (manufactured by Sumika Bayer Urethane Co., Ltd.), Coronate (registered trademark) HL, HX, L (manufactured by Nippon Polyurethane Industry Co., Ltd.), P301-75E (manufactured by Asahi Kasei Corporation), and Burnock (registered trademark) D-750 (manufactured by DIC Corporation).

Among these, as the adduct type trifunctional or more functional polyisocyanate, Takenate (registered trademark) D-110N, D-120N, D-140N, D-160N manufactured by Mitsui Chemicals, Inc., or Burnock (registered trademark) D-750 manufactured by DIC Corporation is preferable.

Examples of the isocyanurate type trifunctional or more functional polyisocyanate include Takenate (registered trademark) D-127N, D-170N, D-170HN, D-172N, D-177N, D-204 (manufactured by Mitsui Chemicals, Inc.), Sumidur N3300 and Desmodur (registered trademark) N3600, N3900, Z4470BA (manufactured by Sumika Bayer Urethane Co., Ltd.), Coronate (registered trademark) HX, HK (manufactured by Nippon Polyurethane Industry Co., Ltd.), and Duranate (registered trademark) TPA-100, TKA-100, TSA-100, TSS-100, TLA-100, TSE-100 (manufactured by Asahi Kasei Corporation).

Examples of the biuret type trifunctional or more functional polyisocyanate include Takenate (registered trademark) D-165N, NP1100 (manufactured by Mitsui Chemicals, Inc.), Desmodur (registered trademark) N3200 (manufactured by Sumika Bayer Urethane Co., Ltd.), and Duranate (registered trademark) 24A-100 (manufactured by Asahi Kasei Corporation).

Polyol is a compound which has two or more hydroxyl groups, and examples thereof include low molecular weight polyol (for example, aliphatic polyol or aromatic polyol), polyether-based polyol, polyester-based polyol, polylactone-based polyol, castor oil-based polyol, polyolefin-based polyol, and a hydroxyl group-containing amine-based compound.

Note that the low molecular weight polyol means polyol which has a molecular weight of 300 or less, and examples thereof include bifunctional low molecular weight polyol such as ethylene glycol, diethylene glycol, and propylene glycol, and trifunctional or more functional low molecular weight polyol such as glycerin, trimethylolpropane, hexanetriol, pentaerythritol, sorbitol, and the like.

Note that examples of the hydroxyl group-containing amine-based compound include amino alcohol, as an oxyalkylated derivative of the amino compound. Examples of the amino alcohol include propylene oxide or ethylene oxide adduct of the amino compound such as ethylenediamine such as N,N,N',N'-tetrakis[2-hydroxypropyl]ethylenediamine, N,N,N',N'-tetrakis[2-hydroxyethyl]ethylenediamine, and the like.

Polyamine is a compound which has two or more amino groups (primary amino group or secondary amino group), and examples thereof include aliphatic polyvalent amine such as diethylenetriamine, triethylenetetramine, 1,3-propylenediamine, and hexamethylenediamine; an epoxy compound adduct of aliphatic polyvalent amine; alicyclic polyvalent amine such as piperazine; heterocyclic diamine such as 3,9-bis-aminopropyl-2,4,8,10-tetraoxaspiro-(5,5)undecane, and the like.

The mass of the capsule wall of the microcapsule is not particularly limited, but it is preferably 12% by mass or less, and more preferably 10% by mass or less, based on the total mass of the heat storage material contained in the core portion. The fact that the mass of the capsule wall to the heat storage material, which is the encompassed component, is 12% by mass or less indicates that the capsule wall is a thin wall. By thinning the capsule wall, the content of the microcapsule, which encompasses the heat storage material in the heat storage sheet, is increased, and as a result, the heat storage property of the heat storage member is more excellent.

In addition, the lower limit of the mass of the capsule wall is not particularly limited, but it is preferably 1% by mass or more, more preferably 2% by mass or more, and further preferably 3% by mass or more, based on the total mass of the heat storage material, from the viewpoint of holding the pressure resistance of the microcapsule.

Physical Property of Microcapsule

A particle diameter of the microcapsule is not particularly limited, but the volume-based median diameter (D50) is preferably 1 to 80 μm, more preferably 10 to 70 μm, and further preferably 15 to 50 μm.

The volume-based median diameter of the microcapsule can be controlled by changing the dispersion conditions.

Here, the volume-based median diameter of the microcapsule is a diameter at which the total volume of the particles on a large diameter side and a small diameter side is equal in a case in which the entire microcapsule is divided into two by using the particle diameter at which a cumulative volume is 50% as a threshold value. The volume-based median diameter of the microcapsule is measured by using Microtrac MT3300EXII (manufactured by Nikkiso Co., Ltd.).

The thickness (wall thickness) of the capsule wall of the microcapsule is not particularly limited, but it is preferably 0.01 to 10 μm, and more preferably 0.05 to 10 μm.

The wall thickness refers to an average value obtained by measuring and averaging the individual wall thicknesses (μm) of 20 microcapsules by using a scanning electron microscope (SEM).

Specifically, a liquid containing the microcapsule is applied to any support and dried to form a coating film. It is obtained by manufacturing a cross-sectional slice of the obtained coating film, observing the cross section thereof by using the SEM, selecting any 20 microcapsules, observing the cross sections of the individual 20 microcapsules, measuring the wall thicknesses, and calculating the average value. In this case, as the microcapsules to which the wall thickness is measured, the microcapsules having an average particle diameter of ±10% are calculated.

A content of the microcapsule in the heat storage sheet is not particularly limited, but from the viewpoint of having more excellent heat storage property of the heat storage member, it is preferably 75% by mass or more, more preferably 80% by mass or more, further preferably 85% to 99% by mass, and particularly preferably 90% to 99% by mass, based on the total mass of the heat storage sheet.

Manufacturing Method of Microcapsule

A manufacturing method of the microcapsule is not particularly limited, and a known method can be adopted.

In a case in which the capsule wall contains polyurethane urea, polyurethane, or polyurea, an interfacial polymerization method can be adopted, which includes a step (emulsification step) of dispersing the oil phase containing the heat storage material and a capsule wall material in the water phase containing the emulsifier to prepare an emulsified liquid, and a step (capsulation step) of polymerizing the capsule wall material at the interface between the oil phase and the water phase to form the capsule wall, and forming the microcapsule which encompasses the heat storage material.

In a case in which the capsule wall contains a melamine resin, a coacervation method can be adopted, which includes a step (emulsification step) of dispersing the oil phase containing the heat storage material in the water phase containing the emulsifier to prepare the emulsified liquid, and a step (capsulizing step) of adding the capsule wall material to the water phase, forming a polymer layer of the capsule wall material on a surface of emulsified liquid droplet, and forming the microcapsule which encompasses the heat storage material.

Note that the capsule wall material refers to a material which can form the capsule wall.

Each step of the interfacial polymerization method will be described in detail in the following.

In the emulsification step of the interfacial polymerization method, the emulsified liquid is prepared by dispersing the oil phase containing the heat storage material and the capsule wall material in the water phase containing the emulsifier. Note that the capsule wall material contains at least polyisocyanate and at least one compound selected from the group consisting of polyol and polyamine.

The emulsified liquid is formed by dispersing the oil phase containing the heat storage material and the capsule wall material in the water phase containing the emulsifier.

The oil phase contains at least the heat storage material and the capsule wall material, and as needed, may further contain other components such as the solvent, and/or the additive.

The water phase can contain at least an aqueous medium and the emulsifier.

Examples of the aqueous medium include water, and a mixed solvent of water and a water-soluble organic solvent, and it is preferably water. The "water-soluble" means that a dissolved amount of a target substance in 100% by mass of water at 25° C. is 5% by mass or more.

A content of the aqueous medium is not particularly limited, but it is preferably 20% to 80% by mass, more preferably 30% to 70% by mass, and further preferably 40% to 60% by mass, based on the total mass of the emulsified liquid which is a mixture of the oil phase and the water phase.

Examples of the emulsifier include a dispersing agent, a surfactant, or a combination thereof.

Examples of the dispersing agent include a binder, which will be described below, and it is preferably polyvinyl alcohol.

Examples of the surfactant include a nonionic surfactant, an anionic surfactant, a cationic surfactant, and an amphoteric surfactant. The surfactant may be used alone, or may be used in a combination of two types or more.

The content of the emulsifier is preferably more than 0% by mass and 20% by mass or less, more preferably 0.005% to 10% by mass, further preferably 0.01% to 10% by mass, and particularly preferably 1% to 5% by mass, based on the total mass of the emulsified liquid which is a mixture of the oil phase and the water phase.

The water phase may contain other components such as an ultraviolet absorbing agent, an antioxidant, and a preservative, as needed.

The dispersion refers to dispersing the oil phase as oil droplets in the water phase (emulsification). The dispersion can be performed by using means usually used to disperse the oil phase and the water phase (for example, homogenizer, manton gaulin, ultrasound disperser, dissolver, keddy mill, and other known dispersion apparatuses).

A mixing ratio of the oil phase to the water phase (oil phase mass/water phase mass) is preferably 0.1 to 1.5, more preferably 0.2 to 1.2, and further preferably 0.4 to 1.0.

Capsulizing Step

In the capsulizing step, the capsule wall material is polymerized at the interface between the oil phase and the water phase to form the capsule wall, and microcapsule, which encompasses the heat storage material, is formed.

The polymerization is preferably performed under heating. A reaction temperature during the polymerization is preferably 40° C. to 100° C., and more preferably 50° C. to 80° C. In addition, a reaction time of the polymerization is preferably about 0.5 to 10 hours, and more preferably about 1 to 5 hours.

In order to prevent the aggregation of the microcapsules during polymerization, it is preferable that an aqueous solution (for example, water, an aqueous acetic acid solution, or the like) be further added to reduce the collision probability between the microcapsules.

In addition, it is preferable that sufficient stirring be performed.

Further, a dispersing agent for preventing aggregation may be added to a reaction system during the polymerization.

Further, as needed, a charge adjusting agent such as nigrosin or any other auxiliary agent may be added to the reaction system during the polymerization.

Binder

It is preferable that the heat storage sheet contain the binder, in addition to the microcapsule. The heat storage sheet contains the binder, so that the durability of the heat storage sheet is improved.

The binder is not particularly limited as long as it is a polymer which can form a film, and examples thereof include a water-soluble polymer and an oil-soluble polymer.

The "water-soluble" in the water-soluble polymer means that the dissolved amount of the target substance in 100% by mass of water at 25° C. is 5% by mass or more, and a more suitable water-soluble polymer has a dissolved amount of 10% by mass or more.

The "oil-soluble" of the oil-soluble polymer means that a dissolved amount of a target substance in 100% by mass of water at 25° C. is less than 5% by mass.

Examples of the water-soluble polymer include polyvinyl alcohol and modified product thereof, polyacrylic acid amide and its derivative, an ethylene-vinyl acetate copolymer, a styrene-maleic acid anhydride copolymer, an ethylene-maleic acid anhydride copolymer, an isobutylene-maleic acid anhydride copolymer, polyvinylpyrrolidone, an ethylene-acrylic acid copolymer, a vinyl acetate-acrylic acid copolymer, carboxymethyl cellulose, methyl cellulose, casein, gelatin, a starch derivative, gum arabic, and sodium alginate, and polyvinyl alcohol is preferable.

Examples of the oil-soluble polymer include polymers having the heat storage property disclosed in WO2018/207387A and JP2007-31610A.

Among these, as the binder, a water-soluble polymer is preferable, polyol is more preferable, and polyvinyl alcohol is further preferable. To use the water-soluble polymer is suitable for forming the heat storage sheet while maintaining the dispersibility in a case in which an oil in a water type (O/W type) microcapsule liquid in which the core material is the oil-soluble material such as paraffin is prepared.

Examples of the polyvinyl alcohol include Kuraray Poval series manufactured by Kuraray Co., Ltd. (for example, Kuraray Poval PVA-217E, Kuraray Poval KL-318, or the like).

A degree of the polymerization of polyvinyl alcohol is preferably 500 to 5000, and more preferably 1000 to 3000.

A number average molecular weight (Mn) of the binder is not particularly limited, but from the viewpoint of the film hardness, it is preferably 20,000 to 300,000, and more preferably 20,000 to 150,000.

The molecular weight is a value measured by gel permeation chromatography (GPC).

For the measurement by gel permeation chromatography (GPC), HLC (registered trademark)-8020 GPC (manufactured by Tosoh Corporation) is used as a measuring device, and three TSK gel (registered trademark) Super Multipore HZ-H (4.6 mm ID×15 cm, manufactured by Tosoh Corporation) are used as a column, and THF (tetrahydrofuran) is used as the eluent. In addition, as a measurement condition, a sample concentration is 0.45% by mass, a flow rate is 0.35 ml/min, a sample injection amount is 10 μl, a measurement temperature is 40° C., and a refractive index (RI) detector is used.

A calibration curve is produced from 8 samples of "standard sample TSK standard polystyrene" manufactured by Tosoh Corporation: "F-40", "F-20", "F-4", "F-1", "A-5000", "A-2500", "A-1000", and "n-propylbenzene".

A content of the binder in the heat storage sheet is not particularly limited, but from the viewpoints of the balance between the film hardness of the heat storage sheet and the heat storage property of the heat storage member, it is preferably 0.1% to 20% by mass, and more preferably 1% to 11% by mass.

Other Components

The heat storage sheet may contain components other than the microcapsule and the binder. Examples of other components include a thermal conductive material, a flame retardant, an ultraviolet absorbing agent, an antioxidant, and a preservative.

A content of the other components is preferably 10% by mass or less, and more preferably 5% by mass or less, based on the total mass of the heat storage sheet. The lower limit is not particularly limited, but it is 0% by mass, for example.

Note that the "thermal conductivity" of the thermal conductive material means a material having the thermal conductivity of 10 $Wm^{-1}K^{-1}$ or more. Above all, the thermal conductivity of the thermal conductive material is preferably 50 $Wm^{-1}K^{-1}$ or more, from the viewpoint of improving the heat radiation property of the heat storage sheet.

The thermal conductivity (unit: $Wm^{-1}K^{-1}$) is a value measured by a flash method at a temperature of 25° C. by a method compliant with Japanese Industrial Standards (JIS) R1611.

Physical Property of Heat Storage Sheet

A thickness of the heat storage sheet is not particularly limited, but it is preferably 1 to 1000 μm, and more preferably 1 to 500 μm.

The thickness is an average value obtained by observing a cut cross section of the heat storage sheet cut in parallel to a thickness direction with the SEM, measuring any 5 points, and averaging the thicknesses of the 5 points.

A latent heat capacity of the heat storage sheet is not particularly limited, but from the viewpoints of a high heat storage property of the heat storage member and the suitability for temperature adjustment of a heat generating body which generates heat, it is preferably 115 J/ml or more, more preferably 120 J/ml or more, and further preferably 130 J/ml or more. An upper limit is not particularly limited, but it is 300 J/ml or less in many cases.

The latent heat capacity is a value calculated from a result of a differential scanning calorimetry (DSC) and the thickness of the heat storage sheet.

Note that in a case in which it is considered that a high amount of heat storage in a limited space is exhibited, it is considered appropriate to grasp the amount of heat storage in terms of "J/ml (amount of heat storage per unit volume)", but in a case in which the applications to the electronic device are considered, the weight of the electronic device is also important. Therefore, in a case in which it is considered that a high heat storage property is exhibited in a limited mass, it may be appropriate to grasp the heat storage property in terms of "J/g (amount of heat storage per unit mass)". In this case, the latent heat capacity is preferably 150 J/g or more, and more preferably 160 J/g or more. An upper limit is not particularly limited, but it is 300 J/g or less in many cases.

A volume fraction of the microcapsule in the heat storage sheet is not particularly limited, but it is preferably 40% by volume or more, more preferably 60% by volume or more, and further preferably 80% by volume or more, based on the total volume of the heat storage sheet. An upper limit is not particularly limited, but it is less than 100% by volume, for example.

In addition, a volume fraction of a void in the heat storage sheet is not particularly limited, but it is preferably 50% by volume or less, more preferably 40% by volume or less, further preferably 15% by volume or less, and particularly preferably 10% by volume or less, based on the total volume of the heat storage sheet. A lower limit is not particularly limited, but it is 0% by volume, for example.

Manufacturing Method of Heat Storage Sheet

A manufacturing method of the heat storage sheet is not particularly limited, and a known method can be adopted. Examples of the manufacturing method thereof include a manufacturing method of applying the dispersion liquid containing the microcapsule encompassing the heat storage material and the binder used as needed to the substrate and drying the liquid.

Note that as needed, a simple substance of the heat storage sheet can be obtained by peeling off the substrate from a laminate of the obtained substrate and the heat storage sheet.

Examples of the substrate include a resin substrate, a glass substrate, and a metal substrate. Examples of a resin contained in the resin substrate include polyester (for example, polyethylene terephthalate and polyethylene naphthalate), polyolefin (for example, polyethylene and polypropylene), and polyurethane A thickness of the substrate is not particularly limited, but it is preferably 1 to 100 μm, more preferably 1 to 25 μm, and further preferably 3 to 15 μm.

It is preferable that a surface of the substrate be subjected to surface treatment of the substrate, for a purpose of improving the adhesiveness to the heat storage sheet. Examples of a surface treatment method include corona treatment, plasma treatment, providing of a thin layer which is an easy adhesion layer, and the like.

The material which configures the easy adhesion layer is not particularly limited, examples thereof include a resin, more specifically, examples thereof include styrene-butadiene rubber, a urethane resin, an acrylic resin, a silicone resin, and a polyvinyl resin.

A thickness of the easy adhesion layer is not particularly limited, but it is preferably 0.1 to 5 µm, and more preferably 0.5 to 2 µm.

Note that as the substrate, a temporary substrate which can be peeled off may be used.

Examples of the coating method include a die coating method, an air knife coating method, a roll coating method, a blade coating method, a gravure coating method, and a curtain coating method.

In a case of an aqueous solvent, it is preferable that the drying be performed in the range of 60° C. to 130° C.

The coating film may be subjected to the flattening treatment in the step of drying. Examples of the flattening treatment method include a method of applying pressure to the coating film by using a roller, a nip roller, a calender, or the like to increase the filling rate of microcapsule in the film.

In addition, in order to reduce a void ratio in the heat storage sheet, the method is preferable, such as using the microcapsule which is easily deformed, performing drying gently in a case in which the coating film is formed, or performing coating in a plurality of times without forming a thick coating film at one time.

Colored Layer

The colored layer is a layer disposed on the heat storage sheet. By providing the colored layer, it is possible to suppress the tint change of the appearance of the heat storage member even in a case in which the tint of the heat storage sheet is changed. In addition, rubbing when handling it or intrusion of water or the like into the heat storage sheet can be suppressed, and the physical/chemical change in the microcapsule can be suppressed, as a result, the tint change of the heat storage sheet itself can be suppressed.

Note that the colored layer may be disposed so as to be in contact with the heat storage sheet, or may be disposed on the heat storage sheet via another layer (for example, adhesive layer or pressure-sensitive adhesive layer).

The colored layer contains a coloring agent in order to obtain the desired color tone.

Examples of the coloring agent include a pigment and a dye, and the pigment is preferable, the black pigment is more preferable, and the carbon black is further preferable, from the viewpoints of excellent weather fastness and being capable of further suppressing the tint change of the appearance of the heat storage member. Note that in a case in which the carbon black is used, the thermal conductivity of the colored layer is further improved.

Examples of the pigment include various known inorganic pigments and organic pigments in the related art.

Specific examples of the inorganic pigment include the white pigment such as titanium dioxide, zinc oxide, lithopone, light calcium carbonate, white carbon, aluminum oxide, aluminum hydroxide, barium sulfate, and the like, and the black pigment such as carbon black, titanium black, and titanium carbon, iron oxide, graphite, and the like.

Examples of the organic pigment include the organic pigment disclosed in paragraph 0093 of JP2009-256572A.

Examples of the organic pigment include a red pigment such as C. I. Pigment Red 177, 179, 224, 242, 254, 255, 264, and the like, a yellow pigment such as C. I. Pigment Yellow 138, 139, 150, 180, 185, and the like, an orange pigment such as C. I. Pigment Orange 36, 38, 71, and the like, a green pigment such as C. I. Pigment Green 7, 36, 58, and the like, a blue pigment such as C. I. Pigment Blue 15: 6 and the like, and a violet pigment such as C. I. Pigment Violet 23.

The coloring agent may be used alone, or two types or more thereof may be used.

A content of the coloring agent (for example, black pigment) in the colored layer is not particularly limited, but from the viewpoint of being capable of suppressing the tint change of the appearance of the heat storage member, it is preferably 2% to 30% by volume, and more preferably 5% to 25% by volume based on the total volume of the colored layer.

The colored layer may contain the binder.

A type of the binder is not particularly limited, and a known material can be adopted, and a resin is preferable.

As the resin, a resin selected from the group consisting of a fluororesin and a siloxane resin is preferable from the viewpoint of further improving water resistance and flame retardance. By containing the resin selected from the group consisting of the fluororesin and the siloxane resin, which has good water resistance, in the colored layer, it is possible to suppress a chemical change in the microcapsule and to suppress the tint change of the heat storage sheet. The colored layer is preferably a layer having a crosslinking structure in that it can impart functions such as water resistance to the colored layer and suppress the chemical change in the microcapsules.

In the present specification, the presence or absence of the crosslinking structure in the colored layer of the heat storage member is evaluated by the following method.

First, the heat storage member is cut out in a lamination direction to produce a sample having a size of 2 cm square. The obtained sample is immersed in 50 ml of water and stirred with a stirrer for 10 minutes, and the sample is extracted. The water solubility of the colored layer is evaluated by visually confirming whether or not the colored layer remains on a surface of the extracted sample.

Next, the heat storage member is cut out in the lamination direction to produce a sample having a size of 2 cm square. The obtained sample is immersed in 50 ml of N,N-dimethylformamide (DMF) and stirred with a stirrer for 10 minutes, and the sample is extracted. The solvent solubility of the colored layer is evaluated by visually confirming whether or not the colored layer remains on the surface of the extracted sample.

As a result of the above test, in a case in which it is evaluated that the colored layer remains without almost being dissolved in either water or DMF, it is evaluated that the colored layer of the heat storage member has the crosslinking structure.

Examples of the fluororesin include a known fluororesin. Examples of the fluororesin include polytetrafluoroethylene, polyvinyl fluoride, polyvinylidene fluoride, polychlorotrifluoroethylene, and polytetrafluoropropylene.

The fluororesin may be a homopolymer obtained by polymerizing a single monomer, or may be a polymer obtained by copolymerizing two or more types thereof. Further, a copolymer of these monomers and other monomers may be used.

Examples of the copolymer include a copolymer of tetrafluoroethylene and tetrafluoropropylene, a copolymer of tetrafluoroethylene and vinylidene fluoride, a copolymer of tetrafluoroethylene and ethylene, a copolymer of tetrafluoroethylene and propylene, a copolymer of tetrafluoroethylene and vinyl ether, a copolymer of tetrafluoroethylene and perfluorovinyl ether, a copolymer of chlorotrifluoroethylene and vinyl ether, and a copolymer of chlorotrifluoroethylene and perfluorovinyl ether.

Examples of the fluororesin include Obbligato (registered trademark) SW0011F manufactured by AGC COAT-TECH Co., Ltd., SIFCLEAR-F101 and F102 (manufactured by JSR corporation), KYNAR AQUATEC (registered trademark) ARC and FMA-12 (both manufactured by Arkema).

The siloxane resin is a polymer which has a repeating unit having a siloxane skeleton, and a hydrolysis condensate of a compound represented by Formula (1) as follows is preferable.

$$Si(X)_n(R)_{4-n} \quad\quad\quad \text{Formula (1)}$$

X indicates a hydrolyzable group. Examples of the hydrolyzable group include an alkoxy group, a halogen group, an acetoxy group, and an isocyanate group.

R indicates a non-hydrolyzable group. Examples of the non-hydrolyzable group include an alkyl group (for example, a methyl group, an ethyl group, and a propyl group), an aryl group (for example, a phenyl group, a tolyl group, and a mesityl group), an alkenyl group (for example, a vinyl group and an allyl group), haloalkyl group (for example, a γ-chloropropyl group), an aminoalkyl group (for example, a γ-aminopropyl group and γ-(2-aminoethyl) aminopropyl group), an epoxy alkyl group (for example, a γ-glycidoxypropyl group and a β-(3,4-epoxycyclohexyl) ethyl group), a γ-mercapto alkyl group, a (meth)acryloyloxyalkyl group (a γ-methacryloyloxypropyl group), and a hydroxyalkyl group (for example, a γ-hydroxypropyl group).

n indicates an integer of 1 to 4, and is preferably 3 or 4.

The hydrolysis condensate described above is intended to be a compound obtained by hydrolyzing the hydrolyzable group in the compound represented by Formula (1) and condensing the obtained hydrolyzate. Note that the hydrolysis condensate may be a hydrolysis condensate in which all of the hydrolyzable groups are hydrolyzed, and all of the hydrolyzates are condensed (full hydrolysis condensate), or may be a hydrolysis condensate in which a part of the hydrolyzable group is hydrolyzed, and a part of the hydrolyzate is condensed (partial hydrolysis condensate). That is, the hydrolysis condensate may be a full hydrolysis condensate, a partial hydrolysis condensate, or a mixture thereof.

A content of the binder in the colored layer is not particularly limited, but from the viewpoint of being capable of further suppressing the tint change of the appearance of the heat storage member, it is preferably 50% to 98% by volume, and more preferably 75% to 95% by volume based on the total volume of the colored layer.

The binder in the colored layer may be used alone, or two types or more thereof may be used.

The colored layer may contain components other than the coloring agent and the binder. Examples of other components include a thermal conductive material, a flame retardant, an ultraviolet absorbing agent, an antioxidant, and a preservative.

A thickness of the colored layer is not particularly limited, but it is preferably 0.1 to 100 μm, more preferably 0.1 to 15 μm, further preferably 0.5 to 10 μm, and particularly preferably 0.5 to 5 μm. A ratio of the thickness of the colored layer to the thickness of the heat storage sheet is preferably 1/20 or less, and more preferably 1/30 or less. A lower limit is, for example, 1/1000 or more.

A ratio of the thickness of the colored layer to the thickness of the heat storage member is preferably 1/20 or less, and more preferably 1/30 or less. A lower limit is, for example, 1/1000 or more. The ratio of the heat storage sheet in the entire heat storage member can be increased as the colored layer is thinner, so that the heat storage property is more excellent.

The thickness is an average value obtained by observing a cut cross section of the colored layer cut in parallel to a thickness direction with the SEM, measuring any 5 points, and averaging the thicknesses of the 5 points.

One example of the suitable embodiments of the colored layer includes an embodiment in which the film thickness of the colored layer is 15 μm or less and an optical density of the colored layer is 1.0 or more. In a case in which the optical density is in the range described above, even in a case in which the colored layer is thin, the tint change of the appearance of the heat storage member can be further suppressed.

It is preferable that the optical density be 1.2 or more. An upper limit is not particularly limited, but it is 6.0 or less in many cases.

As a measuring method of the optical density, by using X-rite eXact (manufactured by X-Rite Inc.), the optical density is measured at a density status of ISO status T and D50/2° without a filter. Note that as the optical density, a K value of an optical density (OD) value of Xrite is adopted.

A forming method of the colored layer is not particularly limited, and a known method can be adopted. Examples the forming method thereof include a method in which a composition for forming the colored layer including the coloring agent and the binder or a precursor thereof is brought into contact with the heat storage sheet, and the coating film which is formed on the heat storage sheet is subjected to curing treatment as needed, and a method of adhering a colored sheet containing the coloring agent. From the viewpoint of thinning the colored layer, a method in which a composition for forming the colored layer is used is preferable.

The method will be described below in detail.

The coloring agent and the binder contained in the composition for forming the colored layer are as described above.

The precursor of the binder contained in the composition for forming the colored layer means a component that becomes the binder by the curing treatment, and examples thereof include a compound represented by Formula (1) as described above.

The composition for forming the colored layer may contain the solvent (for example, water and an organic solvent), as needed.

A method in which the composition for forming the colored layer is brought into contact with the heat storage sheet is not particularly limited, and examples thereof include a method of applying the composition for forming the colored layer to the heat storage sheet and a method of immersing the heat storage sheet in the composition for forming the colored layer.

Note that examples of the method for applying the composition for forming the colored layer include a method of using a known coating device such as a dip coater, a die coater, a slit coater, a bar coater, an extrusion coater, a curtain flow coater, spray coating, and the like, and a printing device such as gravure printing, screen printing, offset printing, inkjet printing, and the like.

The colored layer may be provided on the entire surface of the heat storage sheet, or may be partially provided in a pattern.

It is preferable that the colored layer be provided on the entire surface of the heat storage sheet from the viewpoint that the tint change in the appearance of the heat storage member can be further suppressed.

One example of the suitable embodiments of the heat storage member includes an embodiment in which the film thickness of the colored layer is 15 μm or less and an optical density of the heat storage member is 1.0 or more. In a case in which the optical density is in the range described above, even in a case in which the colored layer is thin, the tint change of the appearance of the heat storage member can be further suppressed.

One example of more suitable embodiments of the heat storage member includes an embodiment in which the film thickness of the colored layer is 15 μm or less, the optical density of the heat storage member is 1.0 or more, and the content of the heat storage material to the total mass of the heat storage sheet is 65% by mass or more. By adopting the above-described configuration of the heat storage member, it is possible to suppress the tint change in the appearance of the heat storage member while maintaining the excellent heat storage property of the heat storage member.

One example of another suitable embodiments of the heat storage member includes an embodiment in which a ratio of the thickness of the colored layer to the thickness of the heat storage sheet is 1/20 or less, and the content of the heat storage material to the total mass of the heat storage sheet is 65% by mass or more.

Examples of still another more suitable embodiments of the heat storage member include an embodiment in which a ratio of the thickness of the colored layer to the thickness of the heat storage sheet is 1/20 or less, the optical density of the heat storage member is 1.0 or more, and the content of the heat storage material to the total mass of the heat storage sheet is 65% by mass or more. By adopting the above-described configuration of the heat storage member, it is possible to suppress the tint change in the appearance of the heat storage member while maintaining the excellent heat storage property of the heat storage member.

In the first embodiment of the heat storage member, the heat storage member may include a member other than the heat storage sheet and the colored layer.

Figure 2:
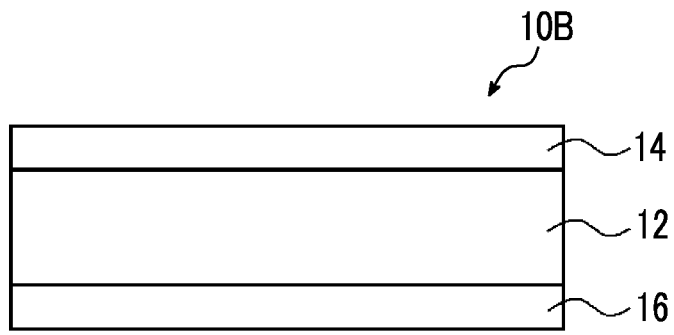
FIG. 2 is a cross-sectional view of a modification example of the heat storage member according to the first embodiment.

For example, the heat storage member may include the substrate described above at a position adjacent to the heat storage sheet. More specifically, as shown in FIG. 2, the heat storage member may be a heat storage member 10B including a substrate 16 the heat storage sheet 12 disposed on the substrate 16, and the colored layer 14 disposed on the heat storage sheet 12.

In addition, in the first embodiment of the heat storage member, the heat storage member may include the easy adhesion layer described above between the heat storage sheet and the substrate.

In addition, in the first embodiment of the heat storage member, the heat storage member may have the adhesive layer or the pressure-sensitive adhesive layer between the heat storage sheet and the colored layer.

In the first embodiment of the heat storage member, it is preferable that the colored layer be positioned at the outermost layer of the heat storage member. That is, in the first embodiment of the heat storage member, it is preferable that the colored layer be disposed on the outermost side (particularly, the most visible side) of the heat storage member. In this case, the colored layer also functions as a protective layer which protects the heat storage sheet.

Figure 3:
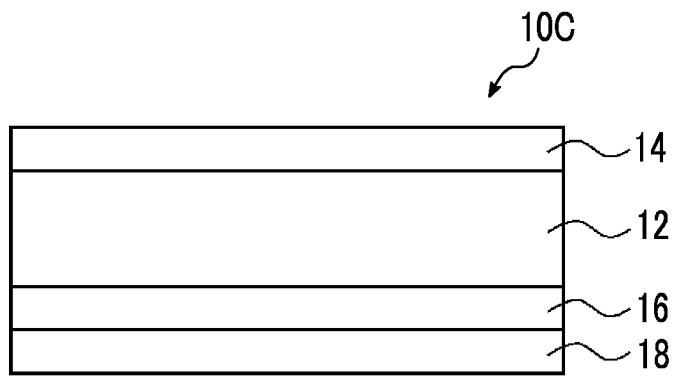
FIG. 3 is a cross-sectional view of a modification example of the heat storage member according to the first embodiment.

In addition, in the first embodiment of the heat storage member, the heat storage member may include an adhesion layer selected from the group consisting of the pressure-sensitive adhesive layer and the adhesive layer on the heat storage sheet opposite to the colored layer side. More specifically, as shown in FIG. 3, the heat storage member may be a heat storage member 10C including an adhesion layer 18, the substrate 16 disposed on the adhesion layer 18, the heat storage sheet 12 disposed on the substrate 16, and the colored layer 14 disposed on the heat storage sheet 12.

As described above, examples of the adhesion layer include a pressure-sensitive adhesive layer and an adhesive layer.

A material of the pressure-sensitive adhesive layer is not particularly limited, and examples thereof include a known pressure sensitive adhesive.

Examples of the pressure sensitive adhesive include an acrylic pressure sensitive adhesive, a rubber-based pressure sensitive adhesive, and a silicone-based pressure sensitive adhesive. In addition, examples of the pressure sensitive adhesive include an acrylic pressure sensitive adhesive, an ultraviolet curing pressure sensitive adhesive, a silicone pressure sensitive adhesive, and the like described in "Characteristic evaluation of peeling paper/peeling film and pressure sensitive adhesive tape and its control technology", published by Johokiko Co., Ltd., 2004, Chapter 2.

Note that the acrylic pressure sensitive adhesive refers to a pressure sensitive adhesive containing a polymer ((meth) acrylic polymer) of a (meth)acrylic monomer.

The pressure-sensitive adhesive layer may further contain a viscosity imparting agent.

A material of the adhesive layer is not particularly limited, and examples thereof include a known adhesive.

Examples of the adhesive include a urethane resin adhesive, a polyester adhesive, an acrylic resin adhesive, an ethylene vinyl acetate resin adhesive, a polyvinyl alcohol adhesive, a polyamide adhesive, and a silicone adhesive.

A forming method of the adhesion layer is not particularly limited, and examples thereof include a method of transferring the adhesion layer to the substrate and a method of applying the composition which includes the pressure sensitive adhesive or the adhesive to the substrate to form the adhesion layer.

A thickness of the adhesion layer is not particularly limited, but it is preferably 1 to 100 μm, more preferably 1 to 25 μm, and further preferably 5 to 15 μm.

A peeling sheet may adhere to a surface of the adhesion layer opposite to the heat storage sheet side. Examples of the peeling sheet include a sheet in which a peeling material such as silicone is attached on a support such as polyethylene terephthalate or polypropylene.

Second Embodiment

Figure 4:
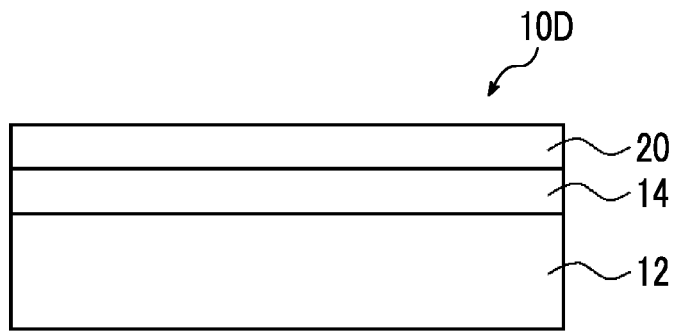
FIG. 4 is a cross-sectional view of a heat storage member according to a second embodiment.

FIG. 4 is a cross-sectional view of a heat storage member according to a second embodiment.

A heat storage member 10D includes the heat storage sheet 12, the colored layer 14 disposed on the heat storage sheet 12, and a protective layer 20 disposed on the colored layer 14. That is, in the heat storage member 10D, the protective layer 20 is disposed on the colored layer 14 opposite to the heat storage sheet 12 side.

The heat storage member 10D, which is the second embodiment of the heat storage member, includes the same member as the heat storage member 10A, which is the first embodiment of the heat storage member, except that the protective layer 20 is provided, the same reference numerals are given, and the description thereof will be omitted below.

Hereinafter, the protective layer will be described in detail.

Protective Layer

The protective layer is a layer disposed on the colored layer opposite to the heat storage sheet side. The protective layer has a function of protecting the colored layer and the heat storage sheet.

A material which configures the protective layer is not particularly limited, and a resin is preferable, and the resin selected from the group consisting of the fluororesin and the siloxane resin is preferable.

Suitable embodiments of the fluororesin and the siloxane resin are the same as the suitable embodiments of the fluororesin and the siloxane resin which may be contained in the colored layer described above.

It is preferable that the protective layer have the cross-linking structure.

The protective layer may contain components other than the resin. Examples of other components include a thermal conductive material, a flame retardant, an ultraviolet absorbing agent, an antioxidant, and a preservative.

The thickness of the protective layer is not particularly limited, but it is preferably 50 µm or less, more preferably 0.01 to 25 µm, and further preferably 0.5 to 15 µm.

The thickness is an average value obtained by observing a cut cross section of the protective layer cut in parallel to a thickness direction with the SEM, measuring any 5 points, and averaging the thicknesses of the 5 points.

A forming method of the protective layer is not particularly limited, and a known method can be adopted. Examples of the forming method thereof include a method in which the composition for forming the protective layer containing a resin or a precursor thereof is brought into contact with the colored layer, and the coating film which is formed on the colored layer is subjected to the curing treatment as needed, and a method of adhering the protective layer to the colored layer.

Hereinafter, a method in which the composition for forming the protective layer is used will be described in detail.

The resin contained in the composition for forming the protective layer is as described above.

Note that the precursor of the resin means a component that becomes a resin by the curing treatment, and examples thereof include a compound represented by Formula (1) as described above.

The composition for forming the protective layer may contain the solvent (for example, water and an organic solvent), as needed.

The method in which the composition for forming the protective layer is brought into contact with the colored layer is not particularly limited, and examples thereof include a method of applying the composition for forming the protective layer to the colored layer and a method of immersing the colored layer in the composition for forming the protective layer.

Note that examples of the method for applying the composition for forming the protective layer include a method of using a known coating device such as a dip coater, a die coater, a slit coater, a bar coater, an extrusion coater, a curtain flow coater, spray coating, and the like, and a printing device such as gravure printing, screen printing, offset printing, inkjet printing, and the like.

Physical Property of Heat Storage Member

A latent heat capacity of the heat storage member is not particularly limited, but from the viewpoint of the suitability for temperature adjustment of the heat generating body which generates heat, it is preferably 115 J/ml or more, more preferably 120 J/ml or more, further preferably 125 J/ml or more, and particularly preferably 130 J/ml or more. An upper limit is not particularly limited, but it is 300 J/ml or less in many cases.

In addition, the latent heat capacity of the heat storage member is preferably more than 145 J/g, more preferably 150 J/g or more, and further preferably 160 J/g or more. The upper limit is not particularly limited, but it is 300 J/g or less in many cases.

The latent heat capacity of the heat storage member can be measured by the same method as the latent heat capacity of the heat storage sheet.

In the second embodiment of the heat storage member, the heat storage member may include a member other than the heat storage sheet, the colored layer, and the protective layer.

For example, in the second embodiment of the heat storage member, the heat storage member may include the substrate described above at a position adjacent to the heat storage sheet.

In addition, in the second embodiment of the heat storage member, the heat storage member may include the easy adhesion layer described above between the heat storage sheet and the substrate.

In addition, in the second embodiment of the heat storage member, the heat storage member may have the adhesive layer or the pressure-sensitive adhesive layer between the heat storage sheet and the colored layer.

In addition, in the second embodiment of the heat storage member, the heat storage member may include an adhesion layer selected from the group consisting of the pressure-sensitive adhesive layer and the adhesive layer on the heat storage sheet opposite to the colored layer side.

The heat storage member according to the embodiment of the present invention can be applied to various applications.

For example, the heat storage member can be used as heat storage and heat radiation members for stable operation by holding the surface temperature of a heat generating unit in the electronic device in any temperature region.

Further, it can be suitably used in applications such as building materials (such as flooring materials, roofing materials, wall materials, and the like), which are suitable for temperature control to rapid temperature rise during the day or during indoor heating and cooling; clothing (such as underwear, outerwear, winter clothes, gloves, and the like), which are suitable for temperature control depending on the changes in environmental temperature or changes in body temperature during exercise or rest; bedding; and an exhaust heat utilization system which stores unnecessary exhaust heat and uses it as heat energy.

EXAMPLES

Hereinafter, the present invention will be described in more detail with reference to Examples. However, the present invention is not limited to the following Examples as long as it does not exceed the gist of the present invention.

Example 1

Preparation of Microcapsule Dispersion Liquid

A solution A to which 120 parts by mass of ethyl acetate were added was obtained by heating and dissolving 72 parts by mass of icosane (latent heat storage material; an aliphatic hydrocarbon having a melting point of 37° C. and 20 carbon atoms) at 60° C.

Next, a solution B was obtained by adding 0.05 parts by mass of N,N,N',N'-tetrakis(2-hydroxypropyl)ethylenediamine (Adeka Polyether EDP-300, manufactured by ADEKA CORPORATION) to the solution A being stirred.

Further, a solution C was obtained by adding 4.0 parts by mass of trimethylolpropane adduct (Burnock D-750, manufactured by DIC Corporation) of tolylene diisocyanate dissolved in 1 part by mass of methyl ethyl ketone to the solution B being stirred.

Then, the solution C was added to a solution obtained by dissolving 7.4 parts by mass of polyvinyl alcohol (Kuraray Poval (registered trademark) KL-318 (manufactured by Kuraray Co., Ltd.; PVA) as the binder in 140 parts by mass of water, and the mixture was emulsified and dispersed. 250 parts by mass of water were added to the emulsified liquid after emulsification and dispersion, the mixture was heated to 70° C. while stirring the obtained solution, and then cooled to 30° C. after continuing stirring for 1 hour. Water was further added to the cooled liquid to adjust a concentration, and an icosane-encompassing microcapsule dispersion liquid which has a polyurethane urea capsule wall was obtained. The concentration of solid contents of the dispersion liquid was 14% by mass.

The volume-based median diameter D50 of the microcapsule in the obtained dispersion liquid was 20 μm. In addition, the thickness of the capsule wall of the microcapsule was 0.1 μm.

Preparation of Composition for Forming Heat Storage Sheet

By adding and mixing 1.5 parts by mass of a side chain alkylbenzene sulfonic acid amine salt (NEOGEN T, manufactured by DKS Co., Ltd.), 0.15 parts by mass of sodium=bis(3,3,4,4,5,5,6,6,6-nonafluorohexyl)=2-sulfinate oxysuccinate (W-AHE, manufactured by FUJIFILM Corporation), and 0.15 parts by mass of polyoxyalkylene alkyl ether (Noigen LP-90, manufactured by DKS Co., Ltd.) to 1000 parts by mass of the obtained microcapsule dispersion liquid, and a composition 1 for forming the heat storage sheet was obtained.

Preparation of Composition 1 for Forming Colored Layer

The components as follows were mixed to prepare a composition 1 for forming the colored layer.

24.2 parts by mass of KYNAR Aquatec ARC (manufactured by Arkema, 44% by mass of concentration of solid contents; fluororesin)

21.4 parts by mass of Epocros WS-700 (manufactured by Nippon Shokubai Co., Ltd., 25% by mass of concentration of solid contents; curing agent)

33.2 parts by mass of FUJI JET BLACK B-15 (manufactured by Fuji Pigment Co., Ltd., 15% by mass of concentration of solid contents, carbon black)

20.0 parts by mass of Taien E (manufactured by Taihei Chemical Industrial Co., Ltd.; flame retardant, diluted in water dispersion liquid which has 20% by mass of a concentration of solid contents)

1.2 parts by mass of Noigen LP-70 (manufactured by DKS Co., Ltd. (diluted in an aqueous solution with 2% by mass of the concentration of solid contents); surfactant)

Manufacturing of Polyethylene Terephthalate (PET) Substrate (A) with Easy Adhesion Layer and Pressure-Sensitive Adhesive Layer An optical clear adhesive sheet MO-3015 (thickness: 5 μm) manufactured by LINTEC Corporation was attached to the PET substrate which has a thickness of 12 μm to form the pressure-sensitive adhesive layer.

An aqueous solution in which Nipol Latex LX407C4E (manufactured by Zeon Corporation), Nipol Latex LX407C4C (manufactured by Zeon Corporation), and Aquabrid EM-13 (manufactured by Daicel Fine Chem Ltd.) were mixed and dissolved such that the concentration of solid contents was 22:77.5:0.5 (mass-based) was applied on the surface of the PET substrate opposite to the surface including the pressure-sensitive adhesive layer, and dried at 115° C. for 2 minutes to form the easy adhesion layer formed of a styrene-butadiene rubber resin which has a thickness of 1.3 μm and prepare a PET substrate (A) with the easy adhesion layer and the pressure-sensitive adhesive layer.

Manufacturing of Heat Storage Member 1

The composition 1 for forming the heat storage sheet was applied to the surface of the easy adhesion layer of the PET substrate (A) with the easy adhesion layer and the pressure-sensitive adhesive layer opposite to the PET substrate side by a bar coater such that the mass after drying was 133 g/m$^2$ and dried to form the heat storage sheet. The heat storage sheet had the thickness of 190 μm.

Next, the composition 1 for forming the colored layer was applied to the surface of the heat storage sheet opposite to the PET substrate and dried to form a colored layer 1 having a thickness of 3 μm to manufacture a heat storage member 1.

Note that the content of the microcapsule in the heat storage sheet to the total mass of the heat storage sheet was 91% by mass. In addition, the content of the heat storage material (icosane) in the heat storage sheet to the total mass of the heat storage sheet was 85% by mass.

Example 2

A heat storage member 2 was manufactured in accordance with the same procedure as in Example 1 except that a composition 2 for forming the colored layer, which will be described below, was used instead of the composition 1 for forming the colored layer.

Preparation of Composition 2 for Forming Colored Layer

The components as follows were mixed to prepare a composition 2 for forming the colored layer.

4.3 parts by mass of pure water 0.4 parts by mass of 1M sodium hydroxide aqueous solution 47.2 parts by mass of X-12-1098 (manufactured by Shin-Etsu Chemical Co., Ltd., 30% by mass of concentration of solid contents)

15.2 parts by mass of Snowtex XL (manufactured by Nissan Chemical Corporation, 40% by mass of concentration of solid contents, 60 nm of average particle diameter)

31.7 parts by mass of FUJI JET BLACK B-15 (manufactured by Fuji Pigment Co., Ltd., 15% by mass of concentration of solid contents, carbon black)

1.2 parts by mass of Noigen LP-70 (manufactured by DKS Co., Ltd. (diluted in an aqueous solution with 2% by mass of the concentration of solid contents); surfactant)

Example 3

The composition 1 for forming the heat storage sheet was applied to the surface of the easy adhesion layer of the PET substrate (A) with the easy adhesion layer and the pressure-sensitive adhesive layer, which was manufactured in Example 1, opposite to the PET substrate side by a bar coater such that the mass after drying was 133 g/m² and dried to form the heat storage sheet.

Next, a composition 3 for forming the colored layer, which will be described below, was applied to the surface of the heat storage sheet opposite to the PET substrate and dried to form a colored layer 3 having a thickness of 1 μm.

Next, the composition 1 for forming the protective layer, which will be described below, was applied to the surface of the colored layer 3 opposite to the heat storage sheet and dried to form a protective layer 1 having a thickness of 3 μm to manufacture a heat storage member 3.

Preparation of Composition 3 for Forming Colored Layer

The components as follows were mixed to prepare a composition 3 for forming the colored layer.
46 parts by mass of pure water
22.4 parts by mass of KYNAR Aquatec ARC (manufactured by Arkema, 44% by mass of concentration of solid contents; fluororesin)
4.7 parts by mass of Epocros WS-700 (manufactured by Nippon Shokubai Co., Ltd., 25% by mass of concentration of solid contents; curing agent)
26.2 parts by mass of FUJI JET BLACK B-15 (manufactured by Fuji Pigment Co., Ltd., 15% by mass of concentration of solid contents, carbon black)
0.7 parts by mass of Noigen LP-70 (manufactured by DKS Co., Ltd. (diluted in an aqueous solution with 2% by mass of the concentration of solid contents); surfactant)

Preparation of Composition 1 for Forming Protective Layer

The components as follows were mixed to prepare the composition 1 for forming the protective layer.
36.3 parts by mass of KYNAR Aquatec ARC (manufactured by Arkema, 44% by mass of concentration of solid contents; fluororesin)
32.1 parts by mass of Epocros WS-700 (manufactured by Nippon Shokubai Co., Ltd., 25% by mass of concentration of solid contents; curing agent)
30.0 parts by mass of Taien E (manufactured by Taihei Chemical Industrial Co., Ltd.; flame retardant, diluted in water dispersion liquid which has 20% by mass of a concentration of solid contents)
1.6 parts by mass of Noigen LP-70 (manufactured by DKS Co., Ltd. (diluted in an aqueous solution with 2% by mass of the concentration of solid contents); surfactant)

Example 4

A heat storage member 4 was manufactured in accordance with the same procedure as in Example 1 except that a composition 2 for forming the protective layer, which will be described below, was used instead of the composition 1 for forming the protective layer.

Preparation of Composition 2 for Forming Protective Layer

The components as follows were mixed to prepare a composition 2 for forming the protective layer.
5.3 parts by mass of pure water
0.6 parts by mass of 1M sodium hydroxide aqueous solution
70.0 parts by mass of X-12-1098 (manufactured by Shin-Etsu Chemical Co., Ltd., 30% by mass of concentration of solid contents)
22.5 parts by mass of Snowtex XL (manufactured by Nissan Chemical Corporation, 40% by mass of concentration of solid contents, 60 nm of average particle diameter)
1.6 parts by mass of Noigen LP-70 (manufactured by DKS Co., Ltd. (diluted in an aqueous solution with 2% by mass of the concentration of solid contents); surfactant)

Example 5

A heat storage member 5 was manufactured in accordance with the same procedure as in Example 1 except that a composition 3 for forming the protective layer, which will be described below, was used instead of the composition 1 for forming the protective layer.

Preparation of Hydrolyzed Liquid

The components as follows were mixed and stirred for 2 hours to prepare a hydrolyzed liquid.
69 parts by mass of pure water
0.4 parts by mass of acetic acid (manufactured by FUJI-FILM Wako Pure Chemical Corporation)
24.6 parts by mass of X-12-1098 (manufactured by Shin-Etsu Chemical Co., Ltd., 30% by mass of concentration of solid contents)
6 parts by mass of KBE-04 (manufactured by Shin-Etsu Chemical Co., Ltd., 100% by mass of concentration of solid contents)

Preparation of Composition 3 for Forming Protective Layer

The components as follows were mixed to prepare a composition 3 for forming the protective layer.
72 parts by mass of the hydrolyzed liquid described above
27 parts by mass of Snowtex OYL (manufactured by Nissan Chemical Corporation, 20% by mass of concentration of solid contents, 60 nm of average particle diameter)
1 part by mass of Noigen LP-70 (manufactured by DKS Co., Ltd. (diluted in an aqueous solution with 2% by mass of the concentration of solid contents); surfactant)

Comparative Example 1

A heat storage member C1 was manufactured in accordance with the same procedure as in Example 1 except that the colored layer 1 was not provided.

Comparative Example 2

By adding and mixing 1.5 parts by mass of a side chain alkylbenzene sulfonic acid amine salt (NEOGEN T, manufactured by DKS Co., Ltd.), 0.15 parts by mass of sodium=bis(3,3,4,4,5,5,6,6,6-nonafluorohexyl)=2-sulfinate oxysuccinate (W-AHE, manufactured by FUJIFILM Corporation), 0.15 parts by mass of polyoxyalkylene alkyl ether (Noigen LP-90, manufactured by DKS Co., Ltd.) and 224 parts by mass of carbon black (FUJI JET BLACK B-15, manufactured by Fuji Pigment Co., Ltd., 15% by mass of the concentration of solid contents) to 1000 parts by mass of the obtained microcapsule dispersion liquid, and a composition 2 for forming the heat storage sheet was obtained.

A heat storage member C2 was manufactured in accordance with the same procedure as in Comparative Example 1 except that the composition 1 for forming the heat storage sheet was changed to the composition 2 for forming the heat storage sheet.

Evaluation

The following evaluations were performed by using the heat storage members obtained above.

Measurement of Optical Density

For each of the obtained heat storage members, a K value of the optical density (OD) of the colored layer was measured from the colored layer side or the protective layer side by using X-rite eXact (manufactured by X-Rite Inc.). Note Evaluation of Flame Retardance A test was performed based on UL94HB standard (Underwriters Laboratories Inc.) except that each of the obtained heat storage members was attached to an aluminum plate which has a thickness of 0.3 mm, and the flame was contacted from the heat storage member side, and the pass and failure were determined.

Note that in Table 1, "Pass" indicates a pass and "Fail" indicates a failure.

Evaluation of Tint Change

Each of the obtained heat storage members was placed in constant-temperature tank having a temperature of 60° C. and a humidity of 90% and left to stand for 240 hours. The tints of the heat storage member subjected to the heat treatment and the heat storage member before the heat treatment were visually observed, and a case in which the tint was not changed was determined as "not changed", and a case in which the tint was changed was determined as "changed". Note that in a case of "changed", the changed tint is also shown.

In Table 1, the "volume % of coloring agent" column represents the content (volume %) of the coloring agent (carbon black) to the total volume of the colored layer.

In Table 1, "changed (yellow)" means that the tint changed to yellow.

TABLE 1

| | | Example 1 | Example 2 | Example 3 | Example 4 | Example 5 | Comparative Example 1 | Comparative Example 2 |
|---|---|---|---|---|---|---|---|---|
| Heat storage sheet | Type of composition for forming heat storage sheet | 1 | 1 | 1 | 1 | 1 | 1 | 2 |
| Colored layer | Type of composition for forming colored layer | 1 | 2 | 3 | 3 | 3 | Absence | Absence |
| | Resin | Fluororesin | Siloxane resin | Fluororesin | Fluororesin | Fluororesin | | |
| | Volume % of coloring agent | 14 | 14 | 18 | 18 | 18 | | |
| | Thickness (μm) | 3 | 3 | 1 | 1 | 1 | | |
| Protective layer | Type of composition for forming protective layer | Absence | Absence | 1 | 2 | 3 | Absence | Absence |
| | Thickness (μm) | | | 3 | 3 | 3 | | |
| Evaluation | Optical density (OD (K)) | 1.2 | 1.2 | 1.3 | 1.4 | 1.3 | — | 1.3 |
| | Latent heat capacity of heat storage member (J/ml) | 134 | 133 | 132 | 131 | 131 | 124 | 112 |
| | Latent heat capacity of heat storage member (J/g) | 163 | 162 | 159 | 158 | 158 | 145 | 130 |
| | Flame retardance | Pass | Pass | Pass | Pass | Pass | Fail | Fail |
| | Tint change | Not changed | Not changed | Not changed | Not changed | Not changed | Changed (yellow) | Not changed | that Comparative Example 2 corresponds to the optical density of the heat storage sheet containing the carbon black.

Measurement of Latent Heat Capacity

The latent heat capacity of the obtained heat storage member was calculated from the result of the differential scanning calorimetry and the thicknesses of the heat storage sheet and the heat storage member.

Table 1 shows the results.

In addition, the obtained heat storage member was attached to another separately prepared substrate and used.

As shown in Table 1, the heat storage member according to the embodiment of the present invention showed a desired effect.

EXPLANATION OF REFERENCES 10A, 10B, 10C, 10D: heat storage member
12: heat storage sheet
14: colored layer
16: substrate
18: adhesion layer
20: protective layer

What is claimed is:

1. A heat storage member comprising:
a heat storage sheet containing a microcapsule encompassing a heat storage material; and
a colored layer,
a film thickness of the colored layer is 0.5 μm~15 μm,
a ratio of a thickness of the colored layer to a thickness of the heat storage sheet is 1/20 or less,
the heat storage member is used as heat storage and heat radiation members of a heat generating unit in an electronic device.

2. The heat storage member according to claim 1, wherein a capsule wall of the microcapsule contains at least one selected from the group consisting of polyurethane urea, polyurethane, and polyurea.

3. The heat storage member according to claim 2, wherein an optical density of the heat storage member is 1.0 or more.

4. The heat storage member according to claim 2, wherein the colored layer is positioned on an outermost layer.

5. The heat storage member according to claim 2, wherein the colored layer contains a resin selected from the group consisting of a fluororesin and a siloxane resin.

6. The heat storage member according to claim 2, further comprising:
a protective layer on a surface of the colored layer opposite to the heat storage sheet.

7. The heat storage member according to claim 6, wherein the protective layer contains a resin selected from the group consisting of a fluororesin and a siloxane resin.

8. The heat storage member according to claim 1, wherein an optical density of the heat storage member is 1.0 or more.

9. The heat storage member according to claim 1, wherein the colored layer is positioned on an outermost layer.

10. The heat storage member according to claim 1, wherein the colored layer contains a resin selected from the group consisting of a fluororesin and a siloxane resin.

11. The heat storage member according to claim 1, further comprising:
a protective layer on a surface of the colored layer opposite to the heat storage sheet.

12. The heat storage member according to claim 11, wherein the protective layer contains a resin selected from the group consisting of a fluororesin and a siloxane resin.

13. The heat storage member according to claim 1, wherein a content of the heat storage material to a total mass of the heat storage sheet is 65% by mass or more.

14. The heat storage member according to claim 1, wherein the colored layer contains a black pigment.

15. The heat storage member according to claim 14, wherein a content of the black pigment to a total volume of the colored layer is 2% to 30% by volume.

16. The heat storage member according to claim 1, wherein a content of the microcapsule to a total mass of the heat storage sheet is 75% by mass or more.

17. The heat storage member according to claim 1, wherein a latent heat capacity of the heat storage member is 125 J/ml or more.

18. The heat storage member according to claim 1, wherein a latent heat capacity of the heat storage member is more than 145 J/g.

* * * * *